3,297,609
EMULSIFIABLE AMORPHOUS POLYPROPYLENE COMPOSITIONS AND PAPER IMPREGNATED THEREWITH
Hugh J. Hagemeyer, Jr., and Raymond L. Etter, Jr., Longview, Tex., assignors to Eastman Kodak Company, Rochester, N.Y., a corporation of New Jersey
No Drawing. Filed Mar. 19, 1963, Ser. No. 266,165
27 Claims. (Cl. 260—28.5)

The present invention relates to new emulsifiable polyolefinic compositions, the emulsions thereof, and to the process for preparing said compositions. Moreover, this invention additionally relates to their use as binders for pigments and minerals which are coated on paper to improve the appearance, printing and other qualities thereof. The term paper as used herein signifies a substance made in thin sheets or leaves from rags, straw, bark, wood, or other fibrous material, for various uses.

Attempts to produce an emulsifiable polypropylene by the direct oxidation of amorphous polypropylene have heretofore proven unsuccessful, particularly in a large scale commercial sense, due to oxidative degradation and the formation of substantial amounts of formic and acetic acids and water. These undesirable products are the result of the extreme difficulty encountered in controlling the degradation process.

The coating of paper with pigments such as $TiO_2$, calcium carbonate, or minerals such as clay has long been used to improve the quality of paper. However, unless the pigment or mineral coating is suitably bonded to the paper fibers, it will rub off, particularly if the surface is moist. Good binding is also necessary for printing purposes since the inks have a "picking" effect which will destroy the surface unless the coating is properly bound. The adhesive must also be receptive to ink for proper printing qualities.

Objects of the present invention therefore are: to provide useful emulsions of amorphous polypropylene; to establish the conditions necessary for their production; to provide means for controlling the oxidative degradation of amorphous polypropylene; to provide readily emulsifiable compositions comprising large portions of oxidatively degraded amorphous polypropylene; to provide improved pigmented and mineral filled coating compositions which are easily applied to the surface of paper to significantly improve the opacity, brightness, gloss and smoothness characteristics thereof without themselves exhibiting non-uniformity in covering, cracking or crazing, poor pick resistance, or adversely affecting the bulk and wet strength of the paper; to provide these compositions in easily workable emulsion form; to provide a low cost, commercially practicable process for preparing these emulsions; and the resulting coated paper products.

These and other objects are achieved according to the present invention by forming, prior to the oxidation step, blends of the amorphous polypropylene and low-molecular-weight polyethylene. Quite surprisingly, such blends were found to undergo oxidative degradation in a readily controllable manner to emulsifiable compositions without attendant side reactions and undesierable products. It is particularly noted that it is this co-oxidation which produces results as proven by the non-emulsifiability of a simple mixture of amorphous polypropylene and low-molecular-weight oxidized polyethylene. These blends can tolerate a wide range of polypropylene-to-polyethylene ratios in order to obtain the desired results. Moreover, further variations in the final emulsifiable product are obtainable by varying the initial molecular weight of the blend components. The emulsions may be prepared by either ionic or nonionic techniques. The new emulsions of amorphous polypropylene compositions have been found to be excellent carriers and dispersants for pigments and minerals such as $TiO_2$, $CaCO_3$, clay and the like, or other additives such as starch or casein normally employed to impart desirable characteristics to the paper.

By using amorphous polypropylene emulsions, the pigment is well dispersed and bound to the paper in an even manner, and, due to the thermoplastic nature of the polymer, it can be smoothed out or shaped with heat. This permits the paper to retain its bulk and wet strength. Costly calendering is reduced or eliminated in most cases. Furthermore less expensive grades of paper pulp may be utilized in the base sheet to maintain equivalent strength of the final product.

Further advantages of these emulsions are that: they are stable under high shear, allowing faster coating speeds; they may be anionic or nonionic and thereby adaptable to various systems; they are readily compatible with conventional additives such as starch, casein and the like; and their solids content can be adjusted as desired for either the final product or coating or other equipment.

In general these polypropylene compositions are prepared by blending the melts of low-molecular-weight polyolefin waxes such as Eastman's non-oxidized Epolene N–11 with the amorphous polypropylene and oxidizing the resultant blend to an acid number of about 4 to about 30.

Amorphous polypropylene having viscosities varying over a very wide range may be utilized in the subject invention. Normally, materials having viscosities at 150° C. of 1000–200,000 cps. are used. The low-molecular-weight polyethylene may be prepared by degrading branched-chain or linear polyethylene or by direct synthesis.

The directly synthesized polyethylene waxes can be produced by the proper selection of polymerization conditions and catalyst. The temperature for the polymerization is within the range of 200–300° C. and the pressure usually ranges from 600–1200 atmospheres. The catalyst for the reaction is either oxygen or a peroxygen type of compound. Among the catalysts that can be used are benzoyl peroxide, ditertiarybutyl peroxide, lauroyl peroxide, cumene hydroperoxide, tertiarybutyl perbenzoate, caprylyl peroxide, and the like. Telomer waxes such as polyethylene-isopropanol may also be utilized. These waxes are well known and may be prepared as disclosed in Patent No. 2,504,400.

We prefer to use readily available commercial Eastman Epolenes such as N–11 and N–10 degraded low-density polyethylenes having viscosities at 125° C. of 300 and 1800 cps., respectively, or Epolene N–12, a degraded medium density polyethylene having a viscosity at 125° C. of about 300 cps. As aforesaid, the amorphous polypropylene and low-molecular-weight polyethylene may be blended in varying percentages. We have found a 50–50 blend to be a useful combination while others work equally as well.

The usable viscosities of the amorphous polypropylene as measured at 150° C. are considered to range from about 1,000 to about 200,000 cps., and that of the low-molecular-weight polyethylene to range from about 100 to about 20,000 cps., measured at 125° C. It is preferred, however, to employ amorphous polypropylene of viscosities of about 10,000 to about 70,000 cps., measured at 150° C. and polyethylene of viscosities of about 200 to about 500 cps., measured at 125° C.

The amorphous polypropylene of the required viscosities is readily obtained by conventional propylene polymerization techniques employing various coordination catalysts. These polymers are characterized as rubbery and readily soluble in such organic solvents as boiling heptane.

As aforesaid, a convenient method for preparing the polyethylene waxes is by the thermal degradation of high-molecular-weight polyethylene at temperatures within the range of about 200 to about 400° C. The thermal degradation time can vary considerably depending upon the degree of unsaturation and reduction in molecular weight desired. For example, the thermal degradation time can vary from about 10 seconds up to about 2 hours. In some instances, it may be desirable or necessary to heat the polymer for as much as 10 hours and more depending on the other conditions and the type of product desired. Normally, the degradation time and temperature are varied to obtain the desired viscosity range of the degraded product and the time-temperature combination is selected to yield the maximum rate of desired product at the most economical reaction conditions.

The thermal degradation is carried out in an inert atmosphere and in the substantial absence of reactive gases, such as oxygen, hydrogen and the like. Inert gases, such as nitrogen, argon, helium, and the like, can be used to blanket the polymer during the thermal degraadtion reaction.

The thermal degradation can be carried out either batchwise or in a continuous process. In a batch system a stirred vessel containing an inert gas, such as nitrogen, is charged with the polymer to be degraded and the polymer is heated to the desired temperature with adequate agitation and held at that temperature for a specific period of time. Any low boiling products of the thermal degradation reaction can be removed by gas stripping or vacuum stripping of the product. In a continuous system of operation, the polymer to be degraded is fed by an extruder or similar feeding mechanism to a heated tube or pipe. The rate of flow, and temperature of the heated tube are controlled to give the desired viscosity of the degraded material. The degraded polymer is then gas stripped of low boiling products or vacuum stripped by means of a brush still or other similar vacuum stripping means.

A usable variation of the polyethylene wax is obtained by hydrogenating the same in order to reduce substantially the degree of unsaturation of the thermally degraded product. The hydrogenation reaction can be carried out by use of a slurry or fixed bed process and the reaction can be conducted with or without a diluent for the degraded polymer. When a product having a molecular weight within the wax range is desired, the hydrogenation reaction can be readily carried out without a diluent or solvent since waxes are relatively easy to handle in the molten state. However, suitable paraffinic hydrocarbon diluents or solvents can be used if they are desired. The hydrogenation reaction can be carried out using suitable hydrogenation catalysts, for example, Raney nickel, nickel deposited on kieselguhr, nickel depoisted on carbon or alumina, palladium deposited on carbon or alumina, sponge nickel, zirconium promoted nickel catalysts, and the like. During the hydrogenation reaction, hydrogen pressures varying from atmospheric up to 6,000 p.s.i.g. and higher can be used. Preferably, the hydrogen pressure is within the range of 50–2000 p.s.i.g. The hydrogenation temperature can vary from 100° C. up to 400° C. and higher and preferably the temperature is within the range of 150 to 350° C. It has ben found to be quite effective during the reduction with hydrogen to maintain a positive flow of hydrogen through the reactor. A much more effective hydrogenation is accomplished in this manner than in a reaction vessel wherein a positive pressure of hydrogen is maintained.

The blend of the two components is made by melting and mixing in an agitated vessel or by pumping metered amounts into a pipeline mixer or an agitated tank. This blend is then autoxidized with oxygen or an oxygen-containing gas such as air at pressures from atmospheric to 5000 p.s.i. and at temperatures from 100 to 200° C. Either an agitated pot or an agitated vessel is employed for this oxidation, and may be constructed to permit continuous operation. The contact time of the polymer blend with the oxygen-containing gas is varied to obtain a material having an acid number between 4 and 30 with the preferred range being 10–20. The resulting product is pumped from a hold tank into a slabbing machine or run into silicone boxes, or is emulsified immediately after oxidation to obviate a separate heating step.

The invention is further illustrated by the following examples.

EXAMPLE 1

A 500 ml., 3-neck, round-bottom flask was equipped with a Teflon blade stirrer, an inlet tube extending to the bottom of the flask, and an exit for the off-gas. The flask was charged with approximately 150 g. of amorphous polypropylene (viscosity at 150° C.=27,000 cps., I.V.=0.35) and 150 g. of Epolene N–11 (viscosity at 125° C.=300 cps.), and the flask placed in an oil bath at about 150° C. After the materials had reached 150° C. and had become molten, the agitator was started and complete mixing was achieved. The oxygen flow was then started to the agitated blend. The polymer temperature was maintained at 150° C.±5° and samples were removed periodically, the progress of the oxidation being followed by acid number determination of the samples. When the desired acid number was reached, the oxidation was terminated and the polymer poured into a pan and allowed to cool. This material was a light yellow color, tacky, and easily emulsifiiable by both ionic and nonionic techniques. Emulsions containing as much as 80% solids were prepared. The solid material had the following properties:

Viscosity at 125° C. _____ cps__ 610
Softening point _____° C__ 95.3
Penetration _____ 22.9
Acid number _____ 11.9

The following example illustrates the effect of oxidation upon amorphous polypropylene alone.

EXAMPLE 2

300 g. of amorphous polypropylene (viscosity=27,000 cps. at 150° C.) was added to the flask of Example 1. The oxidation was started and after a short time liquid material became entrained with the exit gas and the viscosity of the melt decreased rapidly. An analysis of the entrained liquid showed it to be a mixture of acetic and formic acids and water. As the oxidation continued, more of this liquid evolved and the polymer viscosity decreased to less than 100 cps. The acid number increased to 30–40 after 1 and ½ hours and at that point the oxidation was terminated due to high temperatures and the inability to control the reaction.

EXAMPLE 3

Example 1 was repeated using a 75% amorphous polypropylene, 25% Epolene N–11 mixture as starting material. The resulting oxidized polymer had an acid number of 17.2, was very tacky, and was easily emulsifiable.

Emulsions containing up to 40% solids were prepared. The solid material obtained had the following properties:

| | |
|---|---|
| Viscosity at 125° C. _____ cps__ | 335 |
| Softening point _____ ° C__ | 96.1 |
| Penetration _____ | 25.3 |
| Acid number _____ | 14.1 |

EXAMPLE 4

Example 1 was repeated using a 50–50 mixture of amorphous polypropylene (viscosity at 150° C.=60,000 cps.) and Epolene N–11. A slightly tacky, emulsifiable material was obtained having the following properties:

| | |
|---|---|
| Viscosity at 125° C. _____ cps__ | 1800 |
| Softening point _____ ° C__ | 97.2 |
| Penetration _____ | 19.3 |
| Acid number _____ | 17.5 |

EXAMPLE 5

Example 1 was repeated using a 50–50 mixture of amorphous polypropylene (viscosity at 150° C.=14,000 cps.) and an ethyleneisopropanol telomer wax (viscosity at 125° C.=250 cps.). A tacky, readily emulsifiable material was obtained having the following properties:

| | |
|---|---|
| Viscosity at 125° C. _____ cps__ | 425 |
| Softening point _____ ° C__ | 93.2 |
| Penetration _____ | 23.5 |
| Acid number _____ | 16.8 |

EXAMPLE 6

Example 1 was repeated using a 50–50 mixture of amorphous polypropylene (viscosity at 150° C.=14,000 cps.) and an ethyleneisobutanol telomer wax (viscosity at 125° C.=310 cps). An easily emulsifiable, tacky, light yellow solid was obtained having the following properties:

| | |
|---|---|
| Viscosity at 125° C. _____ cps__ | 460 |
| Softening point _____ ° C__ | 94.4 |
| Penetration _____ | 21.2 |
| Acid number _____ | 17.1 |

EXAMPLE 7

Example 1 was repeated using a 50–50 mixture of amorphous polypropylene (viscosity at 150° C.=12,000 cps.) and a degraded linear high density polyethylene (viscosity at 150° C. of 400 cps.). A slightly tacky, emulsifiable solid was obtained having the following properties:

| | |
|---|---|
| Viscosity at 125° C. _____ cps__ | 320 |
| Softening point _____ ° C__ | 101 |
| Penetration _____ | 16.3 |
| Acid number _____ | 18.4 |

EXAMPLE 8

In a large pilot plant continuous oxidizer capable of handling approximately 100 pounds of feed per hour was prepared approximately 2000 pounds of emulsifiable amorphous polypropylene as follows: A 50–50 blend of amorphous polypropylene (viscosity at 150° C.=13,500 cps.) and Epolene N–11 was oxidized with air at 90 pounds pressure and temperature about 135–150° C. The material was run into silicone-lined boxes and had the following properties:

| | |
|---|---|
| Viscosity at 125° C. _____ cps__ | 550 |
| Acid number _____ | 15.2 |
| Softening point _____ ° C__ | 93.4 |
| Penetration _____ | 20.6 |

Several similarly large batches of excellent-quality emulsions were prepared from the above starting material.

*Preparation of the emulsions*

Emulsions may be prepared by the wax to water, water to wax, or pressure techniques. In both the water to wax, and the wax to water techniques, the solid emulsifiable amorphous polypropylene is mixed with a fatty acid such as oleic acid in a heated agitated container and an amine such as morpholene or 2-amino-2-methyl-1-propanol is added to form the fatty acid soap. In the wax to water method this mixture is then poured into hot or boiling water with good agitation until an emulsion is formed. In the water to wax method, hot water is added to a stirred wax mixture until a good emulsion is obtained. Both techniques worked equally well with the emulsifiable amorphous polypropylene.

In the pressure technique, all of the ingredients are added to an autoclave capable of maintaining around 15–20 pounds steam pressure, and the entire mixture heated to approximately 120° C. and stirred for 20 minutes. The autoclave or reaction vessel is then cooled and emulsion is poured out and diluted if necessary.

Nonionic emulsions may also be prepared by the above-listed techniques using such surfactants as ethylene oxide-nonyl phenol adducts with a small amount of potassium or sodium hydroxide added to effect emulsification.

The following specific examples illustrate the preparation of the emulsions.

EXAMPLE 9

A nonionic emulsion was prepared from the solid emulsifiable amorphous polypropylene described in Example 1. The following quantities were used:

| | Parts |
|---|---|
| Emulsifiable amorphous polypropylene _____ | 40 |
| Oleic acid _____ | 8 |
| 2-amino-2-methyl-1-propanol _____ | 7 |
| Water _____ | 150 |

The solid emulsifiable amorphous polypropylene was mixed with the oleic acid at a temperature of approximately 115 to 120° C. When a homogenous melt was obtained, the 2-amino-2-methyl-1-propanol was added slowly and stirred while maintaining the temperature at below 120° C. for three minutes. This melt was then poured slowly into the vortex of the stirred hot water. The water was maintained at approximately 98 to 100° C. during the addition of the melt. After the melt had been added to the water, the stirring was continued until the emulsion had cooled to approximately 50° C. and then further cooling was obtained by immersing in a bath of cool water. The emulsion was stable, translucent with no unemulsified particles visible.

EXAMPLE 10

A nonionic emulsion was prepared from the solid emulsifiable amorphous polypropylene described in Example 1. The following formulation of quantities of materials were used.

| | Parts |
|---|---|
| Solid emulsifiable amorphous polypropylene _____ | 80 |
| Ethylene oxide-nonyl phenol emulsifier (Renex 697) _____ | 24 |
| Solid KOH _____ | 1.8 |
| Water _____ | 300 |

All of the above ingredients were added to a small 1-liter autoclave and the autoclave heated to 120° C. with stirring. Stirring and heating was continued for 20 to 30 minutes at which time the internal cooling coils of the autoclave were cooled with water and the emulsion cooled to 50° C. within 2 to 3 minutes. The emulsion was slightly milky but stable with no unemulsified particles noted.

*Preparation of coating compositions and coated paper*

In utilizing the amorphous polypropylene emulsions as described above in the pigment and mineral coating of paper, the pigment and/or mineral is prepared in an aqueous suspension and the amorphous polypropylene emulsion added to this suspension to give a uniform coating material. Other components may also be added depending upon the final product desired. These include starch and casein. This coating composition is applied to conventional body stock paper by a conventional coating machine with a conventional weight of coacting such as 12 pounds per ream (25 x 38 x 500) and under normal drying conditions.

The coated surface at this point showed distinct improvements over other sheets coated with pure casein or starch adhesive; and, upon running this new coated material through heated rolls or a supercalendering process, an excellent gloss was obtained with good rub resistance, excellent feel and flexibility. Various types of coaters may be used from the regular size presses to the air blade type coating head, and regular roll coaters.

EXAMPLE 11

A 45% total solids coating formulation was prepared having the following solids content:

| | Parts |
|---|---|
| Amorphous polypropylene emulsion (Example 9) | 5 |
| Starch (Staycom) | 10 |
| Calcium carbonate | 25 |
| Clay (Stellar HT No. 2) | 75 |

This coating composition was applied to one side of a paper body stock, suitable for paper coating, by a conventional coating machine at a coating weight of 11 pounds per ream (25 x 38 x 500) and dried under normal drying conditions. The uncalendered surface showed high brightness, high gloss, excellent wet rub resistance, excellent texture and feel, very little curl and more flexibility than normally noted in a similarly coated sheet with casein as an adhesive. Printing tests were run and showed excellent ink receptivity and no picking. These qualities are illustrated by the following data obtained on the coated and dried paper:

| | |
|---|---|
| Smoothness | 602 |
| Wax pick | 4A |
| Opacity | 95.8 |
| Hunter brightness | 79.8 |
| Ingersoll gloss | 81.2 |
| Hunter gloss | 33.1 |
| I.G.T. printability using No. 1 tack ink___ft./min__ | 330 |

EXAMPLE 12

The coating procedure of Example 11 was repeated using the following coating formulation. A 50% solids mixture was used having a solid content of:

| | Parts |
|---|---|
| Amorphous polypropylene emulsion (Example 9) | 30 |
| Fine coating clay | 100 |

Data obtained on the uncalendered paper coated with this formulation are:

| | |
|---|---|
| Smoothness | 582 |
| Wax pick | 4A |
| Opacity | 94.1 |
| Hunter brightness | 77.1 |
| Ingersoll gloss | 79.4 |
| I.G.T. printability using No. 4 ink _____ft./min__ | 295 |

EXAMPLE 13

The coating procedure of Example 11 was repeated using the following coating formulations:

| | Parts |
|---|---|
| Amorphous polypropylene emulsion (Example 10) | 50 |
| Starch | 50 |
| Calcium carbonate | 20 |
| Fine clay | 30 |

Water was added to make a total solids content of approximately 40–50% solids. Upon coating high quality paperboard the coating was found to have the following properties:

| | |
|---|---|
| Smoothness | 560 |
| Wax pick | 4A |
| Hunter brightness | 80.6 |
| Gloss | 81.2 |
| I.G.T. printability using No. 4 ink _____ft./min__ | 300 |

The invention has been described in detail with particular reference to preferred embodiments thereof but it will be understood that variations and modifications can be effected within the spirit and scope of the invention as described hereinabove and as defined in the appended claims.

We claim:
1. A new composition for coating paper to improve the appearance, printing receptivity and other physical properties of paper comprising a stable dispersion in liquid of a particulate material capable of improving the physical properties of paper and a binder material, the improvement comprising a binder material, prepared by the oxidation of a blend of amorphous polypropylene having a viscosity measured at 150° C. of from 1,000 to about 200,000 cps. and a wax material selected from the group consisting of polyethylene, hydrogenated polyethylene, polyethylene-isopropanol, polyethylene-isobutanol, and mixtures thereof and wherein said blend has been oxidized to an acid number of at least 4.

2. A new composition as defined in claim 1 wherein the wax material is a low-molecular-weight polyethylene prepared by the thermal degradation of branched chain polyethylene and wherein said blend has been oxidized to an acid number of between 4 and 30.

3. A new composition as defined in claim 1 wherein said wax material is a low-molecular-weight polyethylene prepared by thermal degradation of linear polyethylene and wherein said blend has been oxidized, to an acid number of between 4 and 30.

4. A new composition as defined in claim 1 wherein said wax material is a low-molecular-weight polyethylene-isopropanol wax having a viscosity of from about 100 to about 20,000 cps. at 125° C. and wherein said blend of said amorphous polypropylene and said wax material have been oxidized to an acid number of between 4 and 30.

5. A new composition as defined in claim 1 wherein said wax material is a low-molecular-weight polyethylene-isobutanol wax having a viscosity of from about 100 to about 20,000 cps. at 125° C., and wherein said blend of said amorphous polypropylene and said wax material have been oxidized to an acid number of between 4 and 30.

6. A new composition for coating paper to improve the appearance, printing receptivity and other physical properties of paper comprising a stable dispersion in liquid of a particulate material capable of improving the physical properties of paper and a binder material, the improvement comprising a binder material prepared by the oxidation of a blend of amorphous polypropylene having a viscosity measured at 150° C. of from about 1000 to about 200,000 cps., and a wax material having a viscosity of from about 100 to about 20,000 cps. at 125° C. and selected from the group consisting of polyethylene, hydrogenated polyethylene, polyethylene-isopropanol, polyethylene-isobutanol, and mixtures thereof wherein said blend has been oxidized to an acid number of at least 4.

7. A new composition for coating paper to improve the appearance, printing receptivity and other physical properties of paper comprising a stable dispersion in liquid of a particulate material and a binder material, said particulate material being selected from the group consisting of pigments and minerals, the improvement in said composition comprising a binder material prepared by the oxidation of a blend of amorphous polypropylene and a wax material having a viscosity of from about 100 to about 20,000 cps. at 125° C. and selected from the group consisting of polyethylene, hydrogenated polyethylene, polyethylene-isopropanol polyethylene-isobutanol, and mixtures thereof wherein said blend has been oxidized to an acid number of at least 4.

8. A new paper material comprising paper stock having a coating on at least one side of a mixture of a particulate material capable of improving the physical properties of paper and a binder material, said binder material comprising an oxidized blend of amorphous polypropylene and a wax material selected from the group consisting of polyethylene, hydrogenated polyethylene, polyethylene-isopropanol, and polyethylene-isobutanol, and mixtures thereof, said blend having an acid number of between 4 and 30.

9. A new paper material as defined in claim 8 wherein said particulate material is selected from the class consisting of pigments and minerals.

10. A new paper material as defined in claim 9 wherein said particulate material is selected from the group consisting of $TiO_2$, calcium carbonate, clay, and mixtures thereof.

11. A new paper material comprising paper stock having a resinous material embedded in at least one side of said paper, said resinous material comprising a mixture of a particulate material capable of improving the physical properties of paper and a binder material, said binder material comprising an oxidized blend of amorphous polypropylene and a wax material selected from the group consisting of polyethylene, hydrogenated polyethylene, polyethylene-isopropanol, and polyethylene-isobutanol, and mixtures thereof, said blend having an acid number of between 4 and 30.

12. A new paper material comprising paper stock which has been coated on at least one side with a dispersion in liquid of a particulate material capable of improving the physical properties of paper and a binder material prepared by the oxidation of a blend of amorphous polypropylene and a wax material having a viscosity from about 100 to 20,000 cps. at 125° C. and selected from the group consisting of polyethylene, hydrogenated polyethylene, polyethylene-isopropanol, polyethylene-isobutanol, and mixtures thereof wherein said blend has been oxidized to an acid number of at least 4.

13. An emulsifiable composition of matter comprising the product of the oxidation of a blend of amorphous polypropylene having a viscosity measured at 150° C. of from about 1,000 to about 200,000 cps., and wax material having a viscosity of from about 100 to about 20,000 cps. at 125° C. and selected from the group consisting of polyethylene, hydrogenated polyethylene, polyethylene-isopropanol and polyethylene-isobutanol, and mixtures thereof, said blend having an acid number of at least 4.

14. An emulsifiable composition of matter comprising the product of the oxidation of a blend of amorphous polypropylene having a viscosity measured at 150° C. of from about 1,000 to about 200,000 cps., and wax material having a viscosity of from about 100 to about 20,000 cps. at 125° C. and selected from the group consisting of polyethylene, hydrogenated polyethylene, polyethylene-isopropanol and polyethylene-isobutanol, and mixtures thereof, said composition having an acid number of between 4 and 30.

15. An emulsifiable composition of matter prepared by the autoxidation of a blend of amorphous polypropylene having a viscosity of from about 1,000 to about 200,000 cps. at 150° C. and low-molecular-weight polyethylene having a viscosity of between about 100 and 20,000 cps., measured at 125° C., to an acid number of between 4 and 30.

16. A composition of matter comprising a stable dispersion in liquid of material prepared by the autoxidation of a blend of amorphous polypropylene having a viscosity of from about 1,000 to about 200,000 cps. at 150° C. and low-molecular-weight polyethylene having a viscosity of between about 100 and 20,000 cps., measured at 125° C., to an acid number of between 4 and 30.

17. The process of preparing emulsifiable compositions of matter comprising blending the melts of amorphous polypropylene having a viscosity measured at 150° C. of from 1,000 to about 200,000 cps. and low-molecular-weight polyethylene having a viscosity of between about 100 and 20,000 cps., measured at 125° C. and oxidizing the blend at temperatures between about 100 and 200° C. to an acid number between 4 and 30.

18. An emulsifiable composition of matter prepared by the autoxidation of a blend of amorphous polypropylene having a viscosity measured at 150° C. of from 1,000 to about 200,000 cps. and a low-molecular-weight polyethylene having a viscosity of between about 100 and 20,000 cps., measured at 125° C. prepared the thermal degradation of branched chain polyethylene, to an acid number of between 4 and 30.

19. An emulsifiable composition of matter prepared by the autoxidation of a blend of amorphous polypropylene having a viscosity measured at 150° C. of from 1,000 to about 200,000 cps. and a low-molecular-weight polyethylene having a viscosity of between about 100 and 20,000 cps., measured at 125° C. prepared by the thermal degradation of linear polyethylene, to an acid number of between 4 and 30.

20. An emulsifiable composition of matter prepared by the autoxidation of a blend of amorphous polypropylene having a viscosity measured at 150° C. of from 1,000 to about 200,000 cps. and a low-molecular-weight polyethylene-isopropanol wax having a viscosity of between about 100 and 20,000 cps., measured at 125° C., to an acid number of between 4 and 30.

21. An emulsifiable composition of matter prepared by the autoxidation of a blend of amorphous polypropylene having a viscosity measured at 150° C. of from 1,000 to about 200,000 cps. and a low-molecular-weight polyethylene-isobutanol wax having a viscosity of between about 100 and 20,000 cps., measured at 125° C., to an acid number of between 4 and 30.

22. A composition of matter comprising a stable dispersion in liquid of an oxidized blend of amorphous polypropylene having a viscosity measured at 150° C. of from 1,000 to about 200,000 cps. and a wax material selected from the group consisting of polyethylene, hydrogenated polyethylene, polyethylene-isopropyanol and polyethylene-isobutanol, and mixtures thereof, said blend having been oxidized to an acid number of at least 4.

23. A composition of matter comprising a stable dispersion in liquid of an oxidized blend of amorphous polypropylene having a viscosity measured at 150° C. of from 1,000 to about 200,000 cps. and a low-molecular-weight polyethylene prepared by the thermal degradation of branched chain polyethylene, said blend having an acid number of between 4 and 30.

24. A composition of matter comprising a stable dispersion in liquid of an oxidized blend of amorphous polypropylene having a viscosity measured at 150° C. of from 1,000 to about 200,000 cps. and a low-molecular-weight polyethylene prepared by the thermal degradation of linear polyethylene, said blend having an acid number of between 4 and 30.

25. A composition of matter comprising a stable dispersion in liquid of an oxidized blend of amorphous polypropylene having a viscosity measured at 150° C. of from 1,000 to about 200,000 cps. and a low-molecular-weight polyethylene-isopropanol wax having a viscosity of between about 100 and 20,000 cps., measured at 125° C., said blend having an acid number of between 4 and 30.

26. A composition of matter comprising a stable dispersion in liquid of an oxidized blend of amorphous polypropylene having a viscosity measured at 150° C. of from 1,000 to about 200,000 cps. and a low-molecular-weight polyethylene-isobutanol wax having a viscosity of between about 100 and 20,000 cps., measured at 125° C., said blend having an acid number of between 4 and 30.

27. The process of preparing emulsifiable compositions of matter comprising blending the melts of amorphous proplyene having a viscosity measured at 150° C. of from 1,000 to about 200,000 cps. and wax material having a viscosity measured at 125° C. of from about 100 to about 20,000 cps., said wax material being from the group consisting of polyethylene, hydrogenated polyethylene, polyethylene-isopropanol and polyethylene-isobutanol, and mixtures thereof, and oxidizing the blend at temperatures between about 100 and 200° C. to an acid number between 4 and 30.

References Cited by the Examiner
UNITED STATES PATENTS
2,828,296  3/1958  Guillet _____ 260—93.7
3,121,070  2/1964  Coover et al. _____ 260—29.6

FOREIGN PATENTS
489,239  12/1952  Canada.

MURRAY TILLMAN, *Primary Examiner.*
SAMUEL H. BLECH, *Examiner.*
W. J. BRIGGS, Sr., *Assistant Examiner.*